Figure 1:
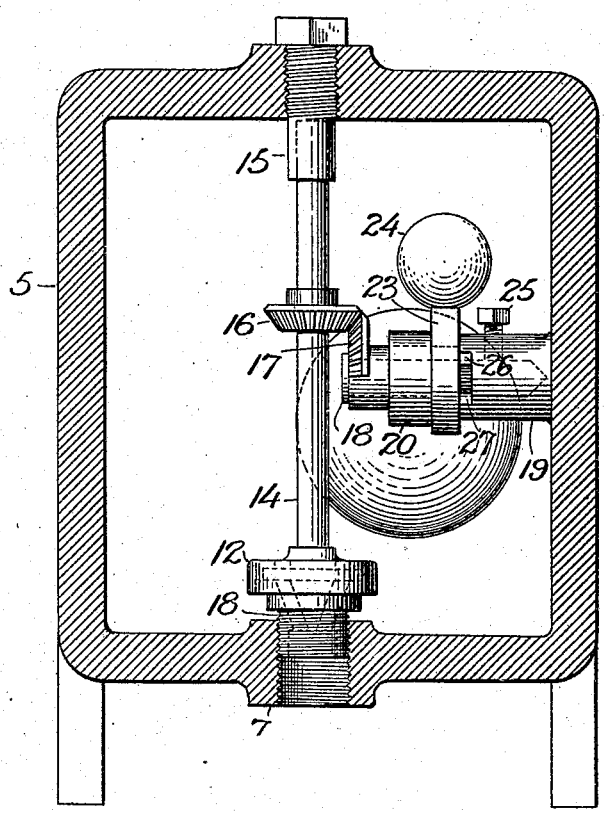

W. WANSTALL.
STEAM TRAP.
APPLICATION FILED SEPT. 3, 1908.

936,963.

Patented Oct. 12, 1909.
2 SHEETS—SHEET 1.

WITNESSES

INVENTOR,
William Wanstall,
BY
ATTORNEY

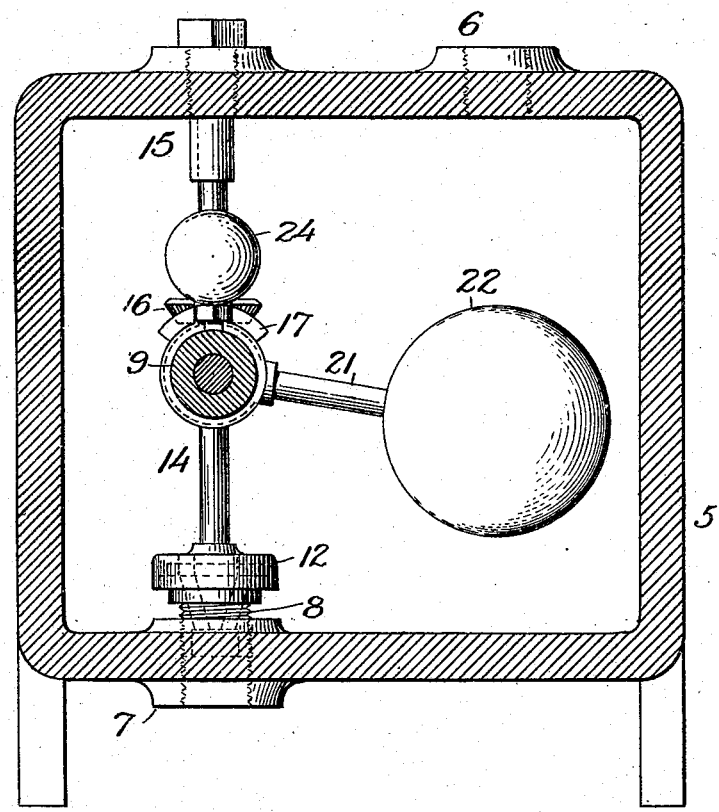
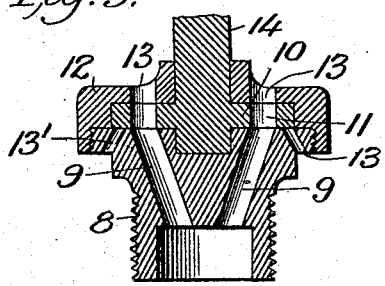
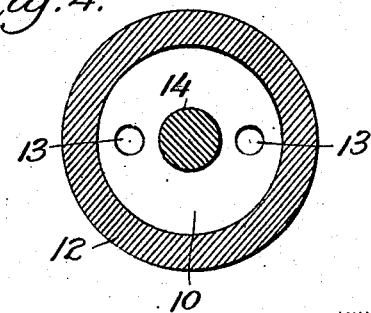

UNITED STATES PATENT OFFICE.

WILLIAM WANSTALL, OF ARLINGTON, NEW JERSEY.

STEAM-TRAP.

936,963.   Specification of Letters Patent.   Patented Oct. 12, 1909.

Application filed September 3, 1908. Serial No. 451,601.

*To all whom it may concern:*

Be it known that I, WILLIAM WANSTALL, a citizen of the United States, residing at Arlington, in the county of Hudson and State of New Jersey, have invented new and useful Improvements in Steam-Traps, of which the following is a specification.

This invention relates to automatically worked valves and more especially to steam traps and has for its object means to allow the accumulated condensed water from a steam or other pipe, which is at certain intervals allowed to escape by automatic means as will be hereinafter more fully explained, set forth in the claims and illustrated in the drawings, where:

Figure 1 is a vertical sectional view of the trap. Fig. 2 is a similar sectional view at right angles with Fig. 1. Fig. 3 is a vertical sectional view of the outlet valve. Fig. 4 is a plan view of same.

The trap consists of the rectangular metal box 5 having an inlet 6 at its top and an outlet 7 in its lower side, and within the latter is a threaded plug 8 having two or more outlets 9 passing through it so as to allow any water to pass from the box. Seated on the top of this plug is a valve 10 which is a disk finished with care and having perforations 11 which co-incide with the upper ends of the openings 9 and fitted upon the valve is a cap 12 with perforations 13 alined with the upper ends of the opening 9. The lower flange of this cap is threaded so that it may be screwed upon the upper end of the plug 8, and this cap also has an opening through which passes the stem 14 of the valve 10, the upper end of the stem being fitted into the socket of an adjusting screw 15 passing through the top of the box 5.

About midway of the stem is attached a beveled gear wheel 16 which meshes with a toothed segment 17 carried at the outer end of a stud 18 supported in a boss 19 projecting from one side of the box, and connected with this segment is a sleeve 20 which moves freely on the stud and carries an arm 21 to the end of which is attached a float 22. An arm 23 also rises vertically from the sleeve 20 and carries at its upper end the counterweight 24. The stud 18 is held in its proper place by a set screw 25 passing through the side of the boss.

In operation the steam and water are admitted through the inlet 6 and as the water accumulates and the condensation takes place, the float 22 is floated, turning the sleeve 20 on its axis together with the segment 17 and partly rotating the gear wheel 16 and turning the shaft 14. Normally the float is in the lower part of the box and the valve occupies a position closing the outlet, but as the water accumulates in the box the float rises and the segment 17 turns the gear wheel 16 and the stem until the perforations in the valve are alined with those of the plug and cap, and the water freely passes out of the box. When once properly adjusted the float can always be depended upon to perform its work at the proper time, so that there is no chance of the box becoming filled.

The counterweight 24 normally stands in a vertical position, but the instant the float begins to rise it is carried past the upright position, and its weight is used to counteract that of the float, and the work to be performed by the rising water is practically *nil*.

The cap 12 relieves the valve 10 of the pressure of the water and steam above to a great degree, the only pressure ordinarily exerted being that permitted through the holes 13; but to equalize this pressure the plug 8 is provided with similar holes 13' which permits the steam and water to press upward on the under side of the valve with as much force as is exerted from above. This reduces the friction to a minimum and with the counterweight leaves very little work for the float 22 to perform.

In order to retain the float and counterweight in certain preferred positions a stop 26 projects from the side of the lever 23 and into a slot 27 in the end of the boss 19. This stop allows a movement of the lever only as far as the stop can travel in the slot.

It is obvious that the operation of such a valve is not confined to a steam trap as this device may be applied to many similar uses when the automatic discharge of liquids is necessary, such as flush tanks, liquid measures or devices where an intermittent supply of water may be required.

The parts of this device may be otherwise arranged or constructed if found necessary without departing from the essential features above described.

What I claim as new and desire to obtain by Letters Patent is:

1. In a steam trap, the combination with a trap casing, of a rotary valve having a vertical rotary stem, gearing mounted on said stem, a gear mounted to oscillate about a horizontal axis adjacent said stem and mesh with its gearing, an arm having one end secured to the oscillating gear, and a float secured directly to the other end of said arm.

2. In a steam trap, the combination with a box having an outlet in its lower side, of a plug with openings, a rotating valve seated in the plug and having openings, a cap with holes corresponding with the openings in the plug, a stem to the valve having a gear wheel, a regulating screw with a socket, a lever with a segment gearing with the wheel, and a float at the end of the lever.

3. In a steam trap, the combination with a box having an outlet in its lower side, of a valve comprising a plug a horizontal disk and a cap with perforations adapted to register, a stem and socketed adjusting screw, a gear wheel, a coöperating gear with an arm, a float on the arm and a counterweight on the arm.

4. In an automatic valve, the combination with a box having an outlet, of a plug filling the outlet, a flat rotating valve in the outlet, a float adapted to turn the valve, and means in the plug for equalizing the pressure on the valve.

5. In an automatic valve, the combination with a box having an inlet and outlet, of a plug filling the outlet and having holes, a rotating valve seated on the plug, a cap with holes fitting over the valve, a stem to the valve and a float with means for turning the stem.

6. In an automatic valve, the combination with a box having an inlet and outlet, of a flat rotating valve at the outlet, a plug in the outlet carrying the valve and having openings above and below the valve to equalize the pressure thereon, and a float with a counterweight for automatically operating the valve.

In testimony whereof I affix my signature in presence of two witnesses.

WILLIAM WANSTALL.

Witnesses:
    JAMES F. DUHAMEL,
    MAE W. CLINTON.